Inventors
HORST REKER &
GOSWIN SCHAFFSTEIN
By [signature]
PATENT AGENT

SWEEP AND FLYBACK CIRCUITS

Filed Dec. 3, 1957 3 Sheets-Sheet 2

Inventors
HORST REKER &
GOSWIN SCHAFFSTEIN
By [signature]
PATENT AGENT

Inventors
HORST REKER &
GOSWIN SCHAFFSTEIN
By [signature]
PATENT AGENT

United States Patent Office 2,965,796

Patented Dec. 20, 1960

2,965,796

SWEEP AND FLYBACK CIRCUITS

Horst Reker and Goswin Schaffstein, Hannover, Germany, assignors to Telefunken G.m.b.H., Berlin, Germany Filed Dec. 3, 1957, Ser. No. 700,516

Claims priority, application Germany Dec. 15, 1956

3 Claims. (Cl. 315—27)

Figure 1:
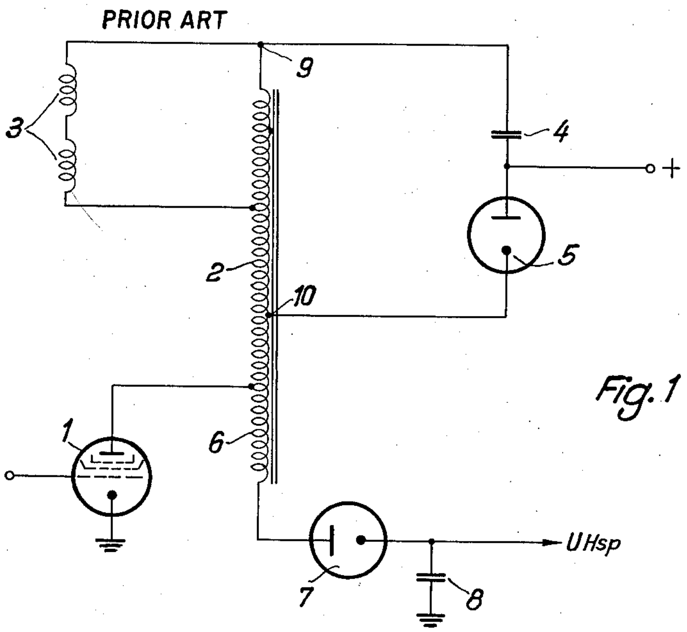

The present invention relates to electronic circuits for producing a saw tooth current in an inductance by means of periodic interruptions of the current fed to this inductance, said circuits employing a switching diode and an externally controlled drive tube serving to control the switching diode as well as to compensate energy losses. There is also provided a winding for producing a high voltage, for insance, for use as a picture tube anode voltage, this winding being coupled with the inductance and feeding a rectifier.

In such circuits, the high voltage tends to decrease with increasing load on the high voltage source, due to increasing beam current of the picture tube. This decrease in high voltage during increase of the beam current is undesirable for several reasons. For example, a reduction in the high voltage also results in a reduction in the picture brightness. In addition, a decrease in high voltage with an increase of the beam current required to increase the picture brightness results in a cancellation effect opposing the desired effect toward brightness increase. Furthermore, the ratio of vertical and horizontal deflection amplitudes will be changed, since the vertical amplitude will increase, even though the deflection current remains constant in the vertical deflection coil if the high voltage on the picture tube decreases. In addition, the current in the horizontal deflection coil will be reduced by the increased load on the high voltage source, so that the horizontal amplitude will remain constant or even decreases with increasing beam current. During this operation, the pictures tend to become vertically elongated.

In order to prevent this, the internal resistance of the high voltage source has been made as low as possible, and it has been proposed to operate the drive tube in its conductive range, i.e., with a low internal resistance. This has the disadvantage that the tube tends to generate Barkhausen short wave oscillations which produce interference on the picture screen. To avoid this disadvantage, it has been proposed to derive a D.C. voltage from the return trace of the sweep voltage across the inductance through which the saw tooth current flows, said D.C. voltage being fed to the drive tube in such a way, that in the event of a reduction of the voltage across the inductance, the average current in the drive tube will be increased.

It has also been known to tune the natural resonant frequency of the high voltage coil to approximately an odd numbered harmonic of the sweep flyback frequency to damp or avoid oscillation in the freely oscillating high voltage coil.

In the known circuits, an optimum value of $n=2.8$ (for a return trace interval of 15% of the sweep period) is given for this frequency ratio, because at this value, the current through the distributed inductance and the first derivative of said current in the return trace should be zero, and also the current at the instant at which the current supply circuit recloses should be zero. It has been observed that the internal resistance of the high voltage source in such a circuit is relatively high.

The invention is based on the discovery that the natural frequency of the high voltage winding shifts towards a low frequency with increase of the beam current. This may, for example, be due to the increase of the space charge capacity of the high voltage switching diode with increasing beam current.

It is an object of the present invention to select the natural frequency of the high voltage winding in such a manner that the ratio:

$$\frac{\text{Natural frequency}}{\text{Flyback frequency}}$$

at a low beam current is smaller than an even integer, namely 4, and is larger than the next smaller odd integer, namely 3, such, that this natural frequency changes with increasing beam current within such a range, that during flyback the recurring peak voltage is almost constant at the input of the high voltage rectifier, despite variations in the beam current.

In a preferred embodiment of the invention, the initial value of the natural frequency of the high voltage winding is selected in such a way that the magnitude of the above frequency ratio at normal beam current (100 to 150 $\mu$a.) does not fall below said next smaller odd integer 3.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 6:
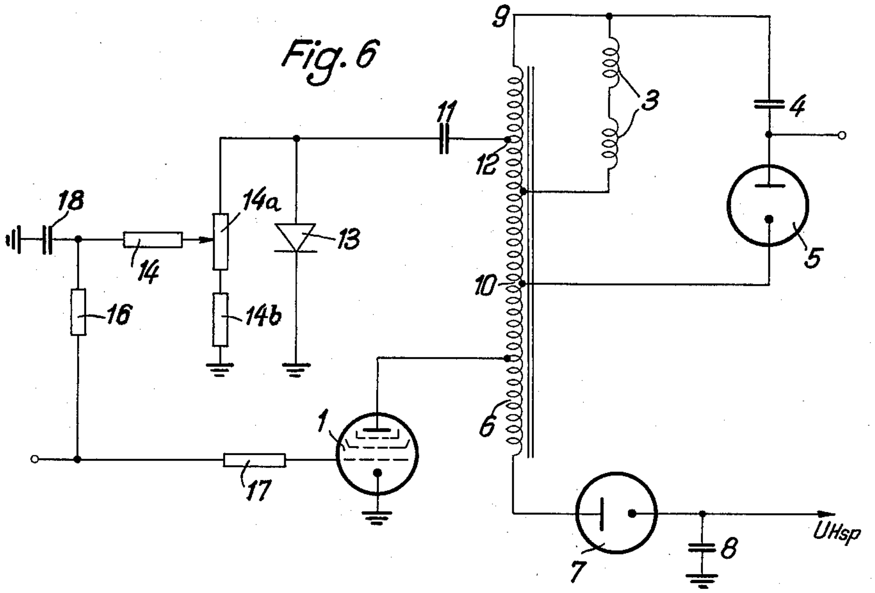

In the drawings:

Figure 1 is a schematic diagram of a sweep and flyback circuit;

Figures 2, 3*a*, 3*b*, 4, 5, 7 and 8 are graphical representations of the functioning of such circuits under various conditions;

Figure 6 is a schematic diagram of a sweep and flyback circuit to which a novel voltage regulatory circuit has been added.

Figure 1 is a known circuit for generating a saw tooth current, referred to as Blumlein-circuit. This circuit shows a drive tube 1 with a sweep transformer 2, deflection coils 3, condenser 4, and a switching diode 5, an operating voltage being fed to the connecting point of this diode with the condenser 4. The high voltage winding 6 of the sweep transformer 2 is connected to a rectifier 7, the output voltage of which is fed from a load condenser 8 to the accelerating anode of a picture tube, not shown. A substantially constant high voltage is fed to a part of the winding of the sweep transformer 2, i.e., is applied across terminals 9 and 10 via the condenser 4 and the switching diode 5 which is conductive during the saw tooth sweep. By the term "substantially constant voltage," a constant D.C. voltage is to be understood which, if necessary, has superimposed on it a voltage component in the shape of a parabola to compensate the so-called tangent error occurring with cathode ray tubes having flat picture screens. Due to this constant D.C. voltage, virtually linearly increasing current flows in the sweep transformer 2 when the switching diode 5 is conductive. When the drive tube 1 is blocked, the switching diode 5 is simultaneously blocked, due to the shape of the voltage fed to the control grid of the tube 1, which voltage is synchronized with the synchronizing pulses received. As a result of this, the deflection coils 3 with the sweep transformer 2 connected thereto and the switch capacities associated therewith carry out a free half-cycle oscillation, thereby blocking the diode and then unblocking it after such a cycle. Thus, the virtually constant D.C. voltage is again applied across the inductance, so that the saw tooth sweep starts again. The voltage peaks occurring in the saw tooth return trace are stepped up by the high voltage winding 6 of the sweep transformer and are utilized as a source of high D.C. voltage for the acceleration anode in the picture tube.

The natural frequency of the high voltage winding 6 is selected in a manner known per se in such a way that it has a certain ratio to the return trace frequency. The return trace frequency in this case is to be understood as the frequency of the oscillation occurring during the return cycle of the sweep, resulting from the return portion of the cycle of the saw tooth current. However, while in the known circuit of Figure 1 the natural frequency of the high voltage winding is selected in such a manner, that the mentioned frequency ratio has a value of 2.8 when the beam current is zero, a different frequency ratio is selected according to the invention, in view of the distributed inductance and of the first derivative of this current being zero at the instant of interruption and at the instant of reclosing of the D.C. current supply circuit.

Figure 2:
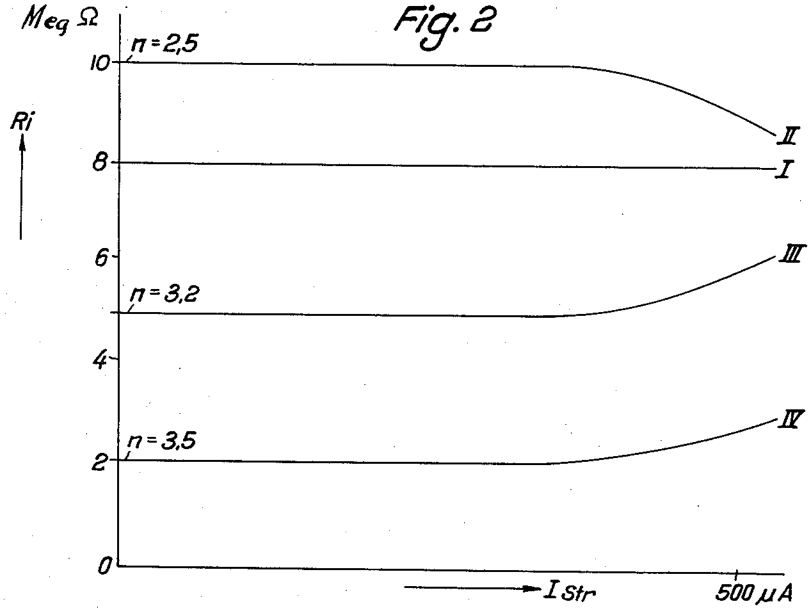

In the known circuit, the tuning has the purpose of preventing the occurrence of self oscillations of the freely oscillating high voltage transformer winding 6. Due to such selection or tuning, the internal resistance of the high voltage source is relatively high. This can be clearly seen in Figure 2, wherein the internal resistance values of the high voltage source are plotted in as graphs against load current for different frequency ratios, said frequency ratios being interpolated to zero beam current and, wherein the current is plotted up to a value of 500 $\mu$a., mean values in a dark room being 100 $\mu$a., in a light room being 150 $\mu$a. In Figure 2, the curve I represents the internal resistance value at various beam currents for a transformer in which the natural frequency of the high voltage winding has not been taken into consideration.

Curve II gives the corresponding values for a frequency ratio of about 2.8 which corresponds to presently known circuits. From the shape of this curve, a relatively high internal resistance of the circuit of about 10 megohms is apparent, as is also a drop of the internal resistance value at higher load currents. This drop is based, among other factors, on the decrease of the initial value 2.8 of the ratio to about 2.5 at 500 $\mu$a. In actual use, this has the disadvantage that the high voltage decreases at higher beam currents, as will be explained with reference to Figures 3*a* and 3*b*.

Figures 3A, 3B:
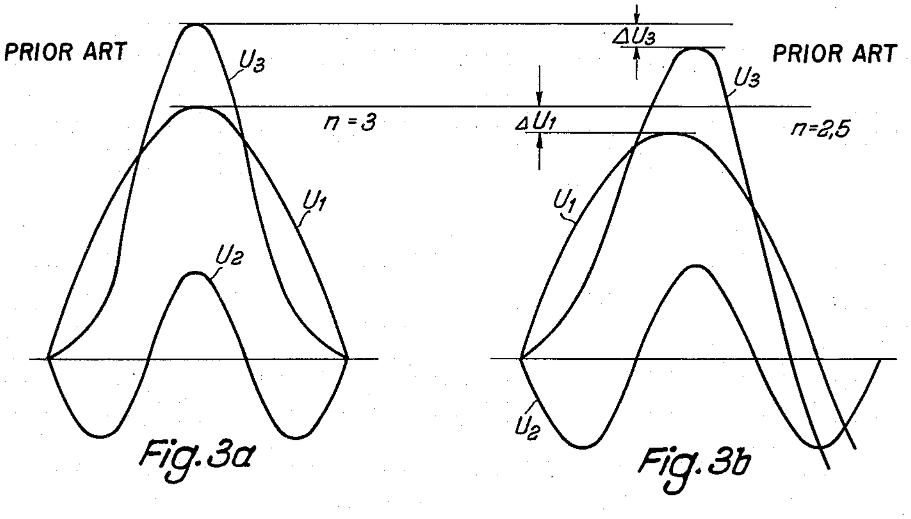

These figures illustrate the form U1, i.e., the return sweep oscillation, and U2, i.e., the natural frequency of the high voltage winding, as measured at the input of the high voltage rectifier 7, the curve U3 of the composite of the magnitudes, which composite is rectified and utilized as the high voltage source for the picture tube. Figures 3*a* and 3*b* show curves of a conventional circuit in which the frequency ratio is about $n=3$. The natural frequency of the high voltage winding is decreased to lower values with increasing beam current, so that the frequency ratio approaches $n=2.5$ at a beam current of 500 $\mu$a. As a result of this, the maximum of the curve U2 is displaced a small amount which does not decrease or only slightly decreases the amplitude of the composite curve $\Delta$U3, because the amplitude of the curve U2 will likewise be increased to a small extent. The amplitude of the return trace curve U1 is simultaneously decreased $\Delta$U1, due to the increasing losses, so that the amplitude of the composite curve U3 will become smaller by $\Delta$U3.

Figure 4:
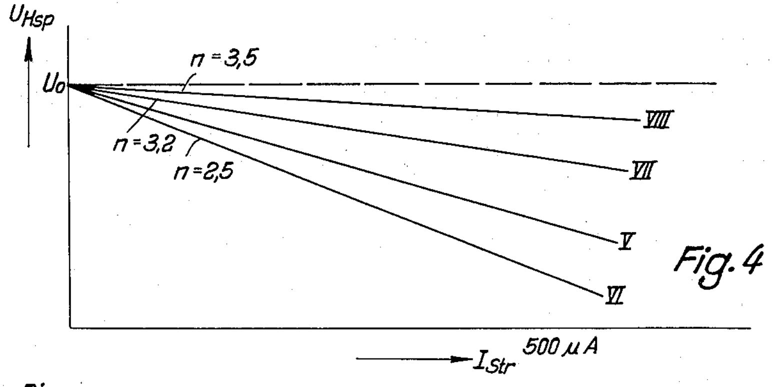

Figure 4 shows the curves of the high voltage output UHSP at different beam current intensities and at different values of an initial frequency ratio *n*, beginning with a value $U_0$ of the high voltage which, desirably, should remain constant. In Figure 4, the curve V corresponds to the curve I of Figure 2, while curve VI of Figure 4 corresponds to curve II of Figure 2, etc. Thus, the known circuits (curve I, II, or V, VI) have an unfavorable high voltage characteristic.

This disadvantage will be avoided if the initial frequency ratio is selected to be a value higher than the odd number 3. This is shown by the curves III (Figure 2) and VII (Figure 4) for an inital frequency ratio of about 3.2, where the internal resistance is only half of the value and where the high voltage has a smaller drop at increased load currents. Still more favorable are the conditions in curve IV (Figure 2), wherein the internal resistance of the high voltage source is shown for a starting frequency ratio of about 3.5. On this curve, the internal resistance value is about 2 megohms at low load current. The corresponding curve VIII (Figure 4) approaches approximately the ideal voltage curve shown in dashed lines.

Figure 5:
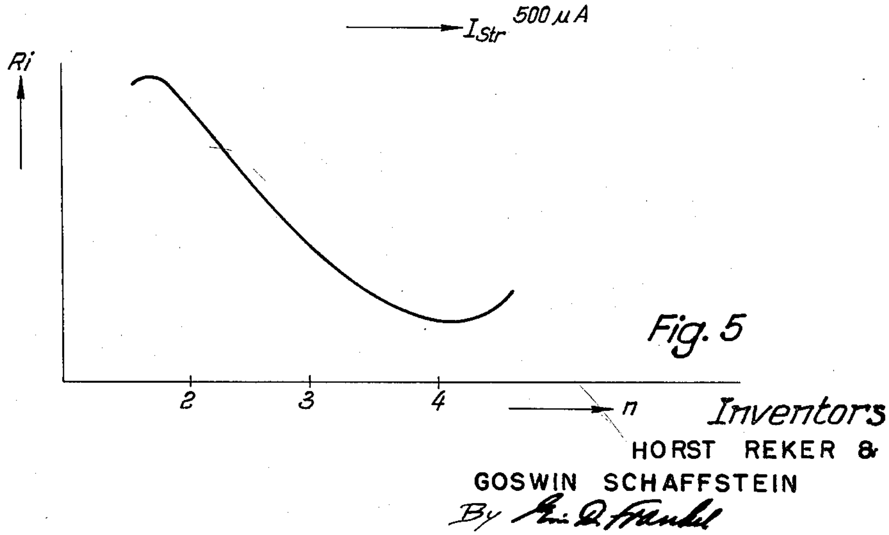

Figure 5 shows a further graph to explain the relation between the internal resistance and the tuning ratio in which the curves of the resistance values are plotted against the frequency ratio at constant beam current.

Preferably, the initial zero-beam-current frequency ratio is adjusted to a value of about 3.3, so that the lower limit of the frequency ratio is about 3 since, at these values, the internal resistance is relatively low and the self oscillations are low or negligible.

The compensation effect and the value of the internal resistance can be increased if the drive tube is controlled within the conductive range and is fed by an additional automatic regulatory control. Such a circuit is shown in Figure 6, in which circuit elements similar to those in Figure 1 have the same reference characters. In the proposed selection of the frequency ratio or natural frequency of the high voltage winding according to the invention, the voltage on the primary winding of the transformer changes much more, due to changes in the tuning, than in the secondary winding on the high voltage rectifier tube. These increased voltage changes are rectified by means of a diode 13 connected to a tap 12 of a primary winding between the points 9 and 10 through a condenser 11, and are applied to the control grid of the drive tube via a voltage divider network **14*a* and 14*b*. Since this diode 13 is only lightly loaded, it serves as a peak voltage rectifier to charge condenser 18 connected across the series coupling resistor chain 14, 16 and 17, so that output control voltage at the junction of resistances 16 and 17 corresponds always to the peak value of the primary voltage appearing at the tap 12**. The operation of the circuit described so far will be explained in connection with Figures 7 and 8.

Figures 7, 8:
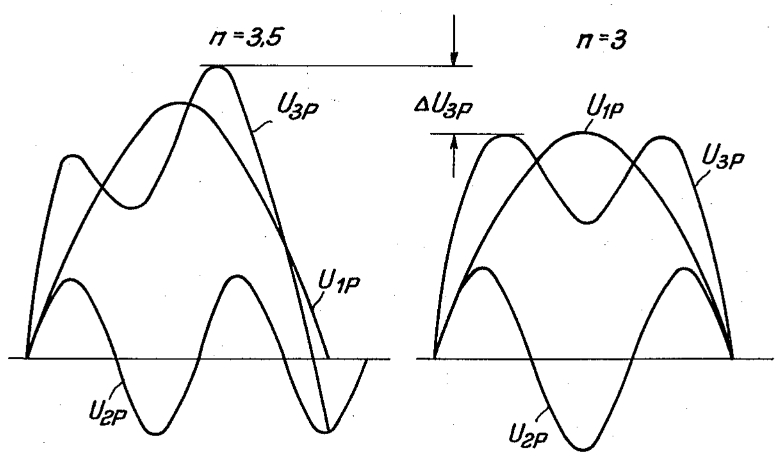

Figure 7 shows the composite curve for an initial frequency ratio of $n=3.5$. It is obvious that the peak value of this composite curve exceeds greatly the peak value of the flyback voltage. In this case, the drive tube 1 receives a greater negative bias potential, whereby all voltages are reduced at the sweep transformer. Because of an increased picture brightness, due to an increased beam current, the natural frequency of the high voltage winding changes and, thus, the frequency ratio changes to a value of, for instance, 3 at 500 $\mu$a.

The curves for such a frequency ratio are shown in Figure 8. This ratio results in a composite curve with a very small peak value, due to a dip in its center. In this way, the drive tube receives a less negative biasing potential, so that the high voltage increases, due to an increased current through the drive tube.

In case the beam current rises further, which is undesirable for the normal operation of a television receiver, because the drive tube may easily be overloaded, the negative control voltage also rises and causes an additional decrease of the high voltage.

We claim:

1. An improvement in a circuit for generating a saw tooth sweep current in an inductance by periodically interrupting the current supplied to this inductance through a switching diode controlled by a drive tube, and said circuit including a high voltage winding coupled with said inductance and connected to a rectifier to provide a source of high D.C. voltage for accelerating the beam of a picture tube, the natural frequency of said high voltage winding having a determinable ratio with respect to the return trace frequency as determined by the period of said trace, said improvement comprising means for tuning the natural frequency of said high voltage winding to a value lying between three and four times said return trace frequency, and means for decreasing said natural frequency toward three times said return trace frequency with increasing beam current at such a rate that the peak voltage across the winding during the return trace remains substantially constant.

2. In a circuit as set forth in claim 1, the internal resistance of the winding being dependent upon its natural frequency whereby, when said ratio falls below 3, the internal resistance of the high voltage source will increase at a rate capable of preventing overloading of the drive tube at high beam currents.

3. In a circuit as set forth in claim 1, a rectifier connected to said inductance to receive therefrom a current proportional to the excitation of said inductance, and said rectifier delivering a component comprising a D.C. control voltage proportional to said excitation; and voltage divider means connected between said drive tube and said rectifier and delivering to the tube a component of said control voltage of such magnitude and polarity that the tube maintains said excitation substantially constant.

References Cited in the file of this patent

UNITED STATES PATENTS

| | | |
|---|---|---|
| 2,474,666 | Haantjes | June 28, 1949 |
| 2,589,299 | Setchell | Mar. 18, 1952 |
| 2,665,393 | Bocciarelli | Jan. 5, 1954 |
| 2,712,092 | Schwartz | June 28, 1955 |
| 2,712,616 | Leeds | July 5, 1955 |
| 2,743,382 | Lufkin | Apr. 24, 1956 |
| 2,832,003 | Andrieu | Apr. 22, 1958 |
| 2,834,913 | Dietch | May 12, 1958 |
| 2,869,030 | Deranian | Jan. 13, 1959 |
| 2,872,615 | Lufkin | Feb. 3, 1959 |